(12) United States Patent
Zeng et al.

(10) Patent No.: US 12,452,675 B2
(45) Date of Patent: Oct. 21, 2025

(54) BLUETOOTH CONNECTION

(71) Applicant: SHENZHEN TCL NEW TECHNOLOGY CO., LTD., Guangdong (CN)

(72) Inventors: Qingzhong Zeng, Guangdong (CN); Feng Zhu, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 399 days.

(21) Appl. No.: 18/257,299

(22) PCT Filed: Aug. 20, 2021

(86) PCT No.: PCT/CN2021/113861
§ 371 (c)(1),
(2) Date: Jun. 14, 2023

(87) PCT Pub. No.: WO2022/127171
PCT Pub. Date: Jun. 23, 2022

(65) Prior Publication Data
US 2024/0048990 A1    Feb. 8, 2024

(30) Foreign Application Priority Data
Dec. 14, 2020  (CN) .......................... 202011465205.9

(51) Int. Cl.
*H04W 12/50*    (2021.01)
*H04W 4/80*    (2018.01)
(Continued)

(52) U.S. Cl.
CPC ............ *H04W 12/50* (2021.01); *H04W 4/80* (2018.02); *H04W 12/037* (2021.01); *H04W 12/041* (2021.01); *H04W 76/14* (2018.02)

(58) Field of Classification Search
CPC ....... H04W 12/50; H04W 76/14; H04W 4/80; H04W 12/037
See application file for complete search history.

(56) References Cited

U.S. PATENT DOCUMENTS

| 10,834,594 B1 * | 11/2020 | Mahurkar ............. H04W 12/69 |
| 2007/0168440 A1 * | 7/2007 | Cobelens ................ H04L 67/51 709/207 |

(Continued)

FOREIGN PATENT DOCUMENTS

| CN | 103475775 A | 12/2013 |
| CN | 105763936 A | 7/2016 |

(Continued)

OTHER PUBLICATIONS

Chinese Office Action issued in corresponding Chinese Patent Application No. 202011465205.9 dated Jan. 17, 2025, pp. 1-8.

(Continued)

*Primary Examiner* — Jonathan A Bui
(74) *Attorney, Agent, or Firm* — PV IP PC; Wei Te Chung

(57) ABSTRACT

A Bluetooth connection method includes: establishing a connection with a Bluetooth device and binding with the Bluetooth device to obtain one or more services supported by the Bluetooth device; obtaining a device class of the Bluetooth device, and selecting a service to be connected from the services; transmitting an audio sink service request based on the selected service to the Bluetooth device, and receiving a response to the audio sink service request; and upon receiving an audio source service request from the Bluetooth device, generating and transmitting a response data packet to the Bluetooth device; transmitting an encryption instruction to the Bluetooth device to perform an encryption process; in response to determining completion of the encryption process, starting a connection to an audio (Continued)

sink service of the Bluetooth device; and in response to determining success of the connection, starting audio transmission to the Bluetooth device.

17 Claims, 5 Drawing Sheets

(51) Int. Cl.
*H04W 12/037* (2021.01)
*H04W 12/041* (2021.01)
*H04W 76/14* (2018.01)

(56) References Cited

U.S. PATENT DOCUMENTS

| | | | |
|---|---|---|---|
| 2011/0281519 A1 | 11/2011 | Reuss | |
| 2015/0043427 A1* | 2/2015 | K. M | H04W 76/14 370/328 |
| 2015/0350816 A1 | 12/2015 | Hsieh | |
| 2016/0072855 A1 | 3/2016 | Palin | |
| 2017/0006415 A1 | 1/2017 | Song | |
| 2022/0095116 A1* | 3/2022 | Abdollahian | G06K 7/1417 |
| 2022/0330359 A1* | 10/2022 | Zhu | H04W 8/005 |

FOREIGN PATENT DOCUMENTS

| | | |
|---|---|---|
| CN | 106708466 A | 5/2017 |
| CN | 106900080 A | 6/2017 |
| CN | 110177357 A | 8/2019 |
| CN | 111132098 A | 5/2020 |
| CN | 111556439 A | 8/2020 |

OTHER PUBLICATIONS

International Search Report in International application No. PCT/CN2021/113861, mailed on Nov. 19, 2021.
Written Opinion of the International Search Authority in International application No. PCT/CN2021/113861, mailed on Nov. 19, 2021.
"The Process of Bluetooth Connection" http://blog.sina.com.cn/s/blog_4b475f4b0101iwua.html, Jan. 6, 2014 (Jan. 6, 2014), p. 1.

* cited by examiner

BLUETOOTH CONNECTION

CROSS-REFERENCE TO RELATED APPLICATIONS

This application is a U.S. national phase of International Application No. PCT/CN2021/113861, filed on Aug. 20, 2021, which claims priority to and the benefit of Chinese Patent Application No. 202011465205.9, filed on Dec. 14, 2020. The disclosures of the aforementioned applications are incorporated herein by reference in their entireties.

TECHNICAL FIELD

The present application relates to the field of Bluetooth connection technologies, and more particularly, to a Bluetooth connection method and system, a smart terminal, and a computer storage medium.

BACKGROUND

Bluetooth is a radio technology that supports short-range communication between devices, which can effectively simplify data communication and voice communication between the devices. There is an increasing demand for wireless devices, and devices such as smart Bluetooth speakers, Bluetooth headsets, and the like are continuously present on the market. In order to perform various functions of Bluetooth devices, such as playing songs, it is first necessary for a device to pair with these Bluetooth devices to establish a wireless link between the device and one of the Bluetooth devices.

When a Basic Rate (BR) device (that is a Bluetooth device) such as a Bluetooth speaker is used, a smart terminal (for example, a smart television or a smartphone) initiates a Bluetooth scan to search for a Bluetooth speaker being around the smart terminal and being in a discoverable and connectable state. When the Bluetooth speaker is found by the smart device, the smart device initiates a request to be paired and bound with the Bluetooth speaker to establish a wireless link connection between the smart terminal and the Bluetooth speaker. After the smart device is successfully bound with the Bluetooth speaker, the smart terminal and the Bluetooth speaker distribute a key negotiated in a binding process, and then the smart terminal obtains a service attribute supported by the Bluetooth speaker through a Service Discovery Protocol (SDP) service discovery request, where the SDP provides a method for discovering an available service and an attribute thereof.

SUMMARY

Technical Problems

In the case that the Bluetooth device to which a connection is initiated supports multiple protocols at the same time, the connection speed will be slow and the connection conflict will be caused when the smart terminal initiates the connection, and finally the connection may fail. In addition, when a portion of the Bluetooth speakers actively initiates a service request again, the smart terminal does not respond to the request or the content of the response will be empty, so that the Bluetooth device does not receive the response or the response is abnormal all the time, and finally the connection is disconnected after timeout.

Accordingly, an improvement and a development is needed for defects existing in the prior art.

Solutions to Problems

Technical Solutions

A main object of the present application is to provide a Bluetooth connection method and system, a smart terminal, and a computer storage medium, so as to solve a problem that a smart terminal and a Bluetooth device in the prior art are prone to a connection failure or a connection disconnection.

To achieve the above object, an embodiment of the present application provides a Bluetooth connection method, including:
  establishing a connection with a Bluetooth device and binding with the Bluetooth device to obtain one more services supported by the Bluetooth device;
  obtaining a device sub-type of the Bluetooth device to select a service to be connected from the services based on the device sub-type;
  transmitting an audio input service request to the Bluetooth device, and receiving a response to the audio input service request from the Bluetooth device, upon receiving an audio output service request from the Bluetooth device, generating and transmitting a response data packet to the Bluetooth device; and
  transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device.

Optionally, in the Bluetooth connection method, the establishing of the connection and the binding specifically include:
  establishing a link connection with the Bluetooth device;
  transmitting a request for obtaining input and output capabilities of the Bluetooth device to the Bluetooth device, receiving the input and output capabilities fed back by the Bluetooth device according to the request, and selecting a mode of binding with the Bluetooth device according to the input and output capabilities;
  upon determining the mode of binding with the Bluetooth device, generating and transmitting a key to the Bluetooth device; and
  transmitting a Service Discovery Protocol (SDP) service discovery request to the Bluetooth device to obtain the services supported by the Bluetooth device.

Optionally, in the Bluetooth connection method, the obtaining the device sub-type and the selecting of the service to be connected specifically include:
  obtaining the device sub-type of the Bluetooth device;
  in response to determining that the device sub-type indicates a Bluetooth speaker, actively transmitting a service request to the Bluetooth speaker, and receiving a service request response to the service request from the Bluetooth speaker;
  parsing the service request response to obtain and store an identifier value in a singly linked list; and
  traversing the identify value in the singly linked list to select a service to be connected from the services.

Optionally, in the Bluetooth connection method, the transmitting the audio input service request to the Bluetooth device and receiving the response to the audio input service request, the receiving the audio output service request and generating and transmitting the response data packet to the Bluetooth device specifically includes:

upon transmitting the audio input service request to the Bluetooth device, receiving and parsing a response to the audio input service request from the Bluetooth device;

in response to receiving the audio output service request from the Bluetooth device, determining whether a connection to an audio receiving end service is started; and in response to determining that the connection is started, obtaining an audio output record and adding an identifier value, and generating and transmitting the response data packet to the Bluetooth device.

Optionally, in the Bluetooth connection method, the Bluetooth connection method further includes: after the determining whether the connection is started, in response to determining that the connection is not started, transmitting an empty content of a response to the Bluetooth device.

Optionally, in the Bluetooth connection method, the Bluetooth connection method further includes: after the obtaining the device sub-type of the Bluetooth device, in response to determining that the device sub-type does not indicate the Bluetooth speaker, obtaining another service request.

Optionally, in the Bluetooth connection method, the mode of binding includes at least one of numeric comparison, just works, out-of-band, or password entry.

In addition, in order to achieve the above object, another embodiment of the present application further provides a smart terminal, including: a memory, a processor, and a Bluetooth connection program stored on the memory and operable on the processor, where the Bluetooth connection program, when executed by the processor, implements steps of the above-described Bluetooth connection method.

In addition, in order to achieve the above object, yet another embodiment of the present application further provides a Bluetooth connection system, including a Bluetooth device and the smart terminal described above, the smart terminal establishing a connection with the Bluetooth device and binding with the Bluetooth device;

where the smart terminal is configured to obtain one or more services supported by the Bluetooth device;

the smart terminal is further configured for obtaining a device sub-type of the Bluetooth device and selecting a service to be connected from the services based on the device sub-type;

the smart terminal is further configured for transmitting an audio input service request to the Bluetooth device and receiving a response to the audio input service request from the Bluetooth device;

the Bluetooth device is configured for transmitting an audio output service request to the smart terminal, and the smart terminal is configured for generating and transmitting a response data packet to the Bluetooth device; and the smart terminal is further configured for transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device.

In addition, in order to achieve the above object, yet another embodiment of the present application further provides a computer storage medium having stored thereon a Bluetooth connection program, where the Bluetooth connection program, when executed by a processor, implements steps of the above-described Bluetooth connection method.

Beneficial Effects of the Present Application

Beneficial Effects

The present application obtains the services supported by the Bluetooth device by establishing the connection and the binding with the Bluetooth device; obtains the device sub-type of the Bluetooth device and selects a service to be connected from the services supported by the Bluetooth device according to the device sub-type; transmitting an audio input service request to the Bluetooth device, and receiving a response to the audio input service request from the Bluetooth device, upon receiving an audio output service request from the Bluetooth device, generating and transmitting a response data packet to the Bluetooth device; and transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device. According to the present application, the services of the Bluetooth device are actively obtained and selected by optimizing a connection process with the Bluetooth device, and a response processing is performed on a service request of the Bluetooth device in time, so that not only a binding connection speed with the Bluetooth device can be improved, but also compatibility and versatility of the Bluetooth device can be improved.

BRIEF DESCRIPTION OF THE DRAWINGS

Description of the Drawings

Figure 1:
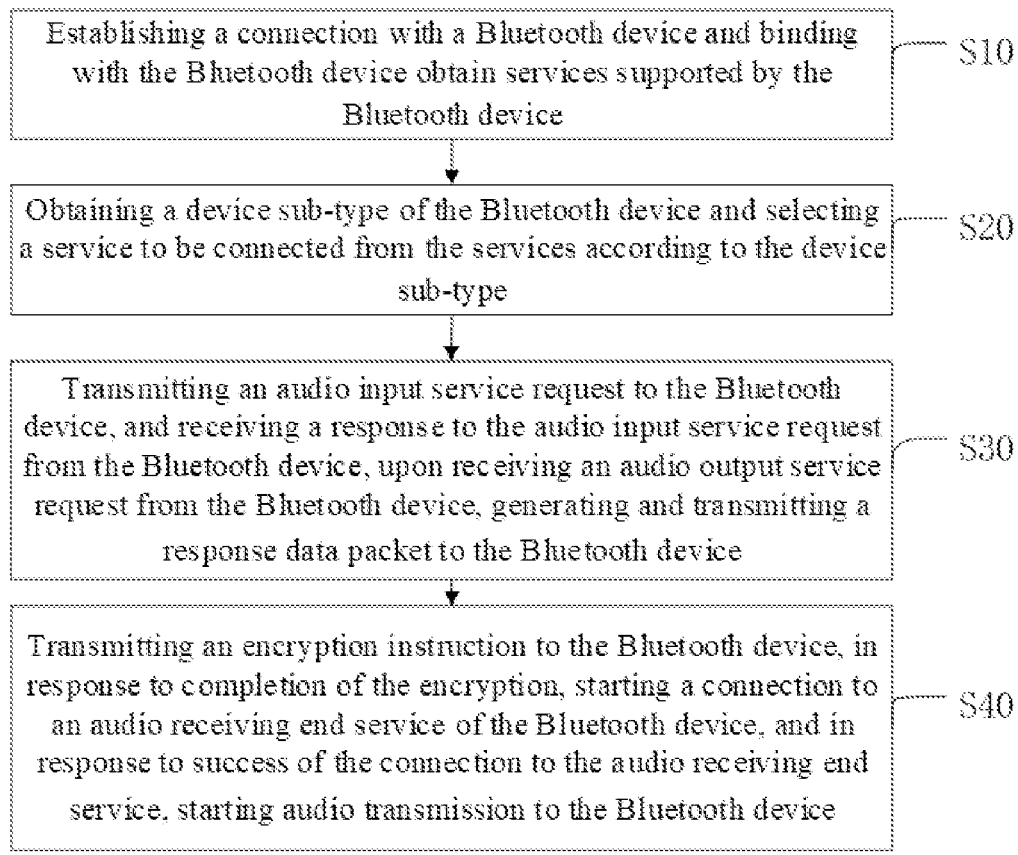

FIG. 1 is a flowchart of a preferred embodiment of a Bluetooth connection method according to the present application.

Figure 2:
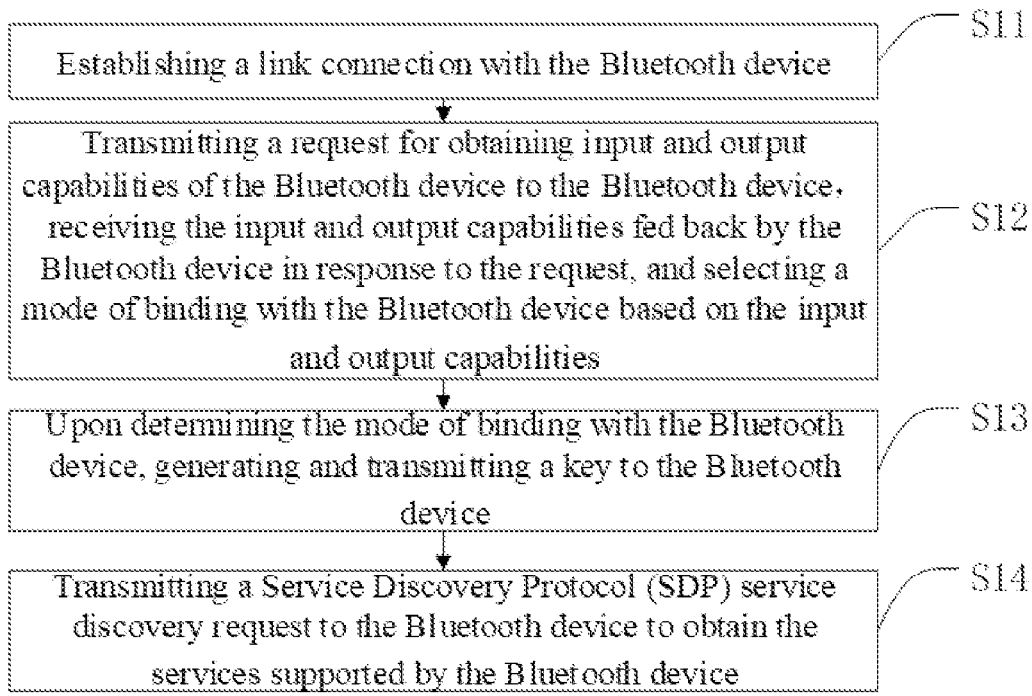

FIG. 2 is a flowchart of a step S10 in the preferred embodiment of the Bluetooth connection method according to the present application.

Figure 3:
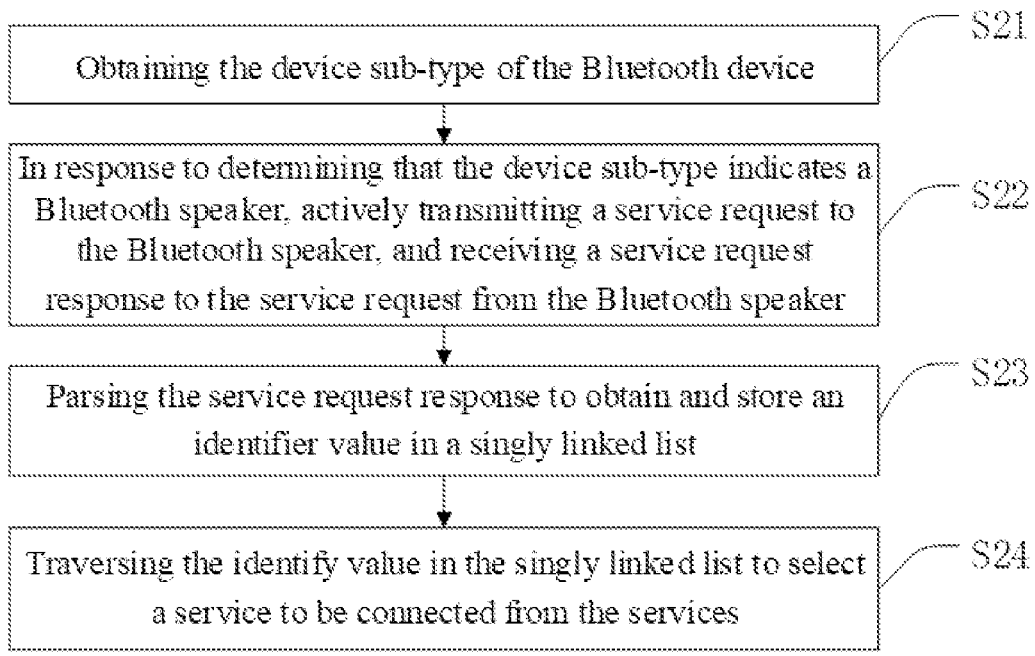

FIG. 3 is a flowchart of a step S20 in the preferred embodiment of the Bluetooth connection method according to the present application.

Figure 4:
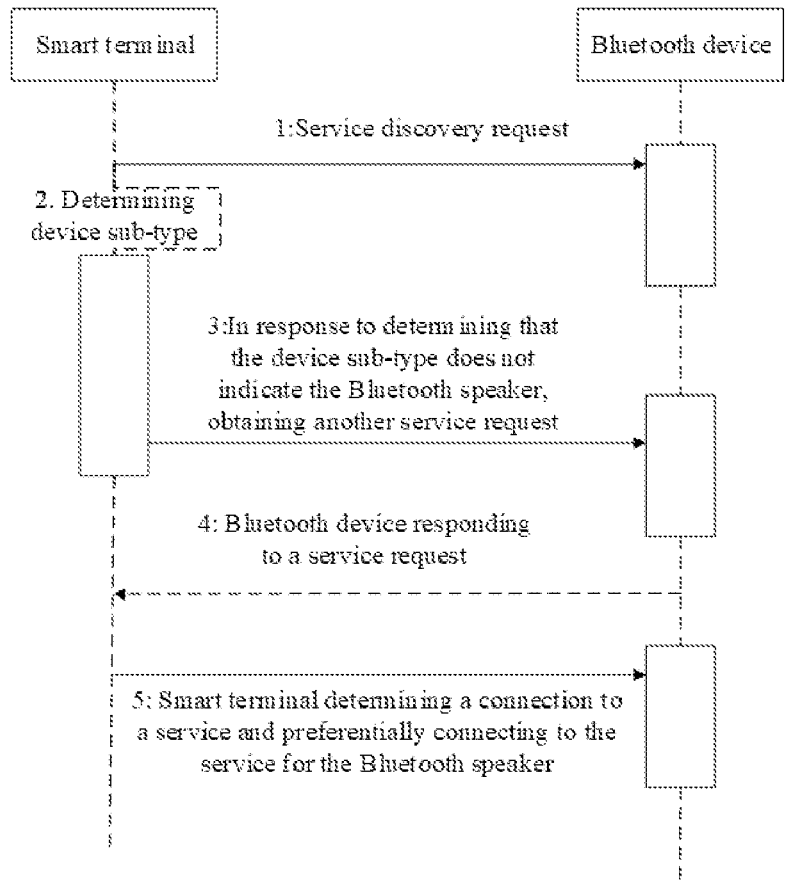

FIG. 4 is a schematic diagram of a smart terminal actively transmitting a service request to a Bluetooth device and selecting a service to be connected in the preferred embodiment of the Bluetooth connection method according to the present application.

Figure 5:
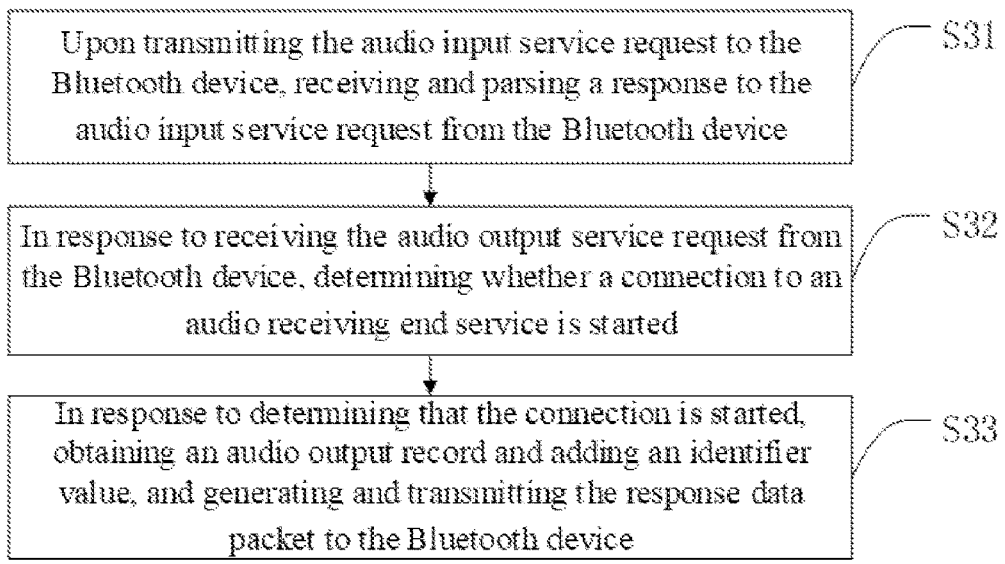

FIG. 5 is a flowchart of a step S30 in the preferred embodiment of the Bluetooth connection method according to the present application.

Figure 6:
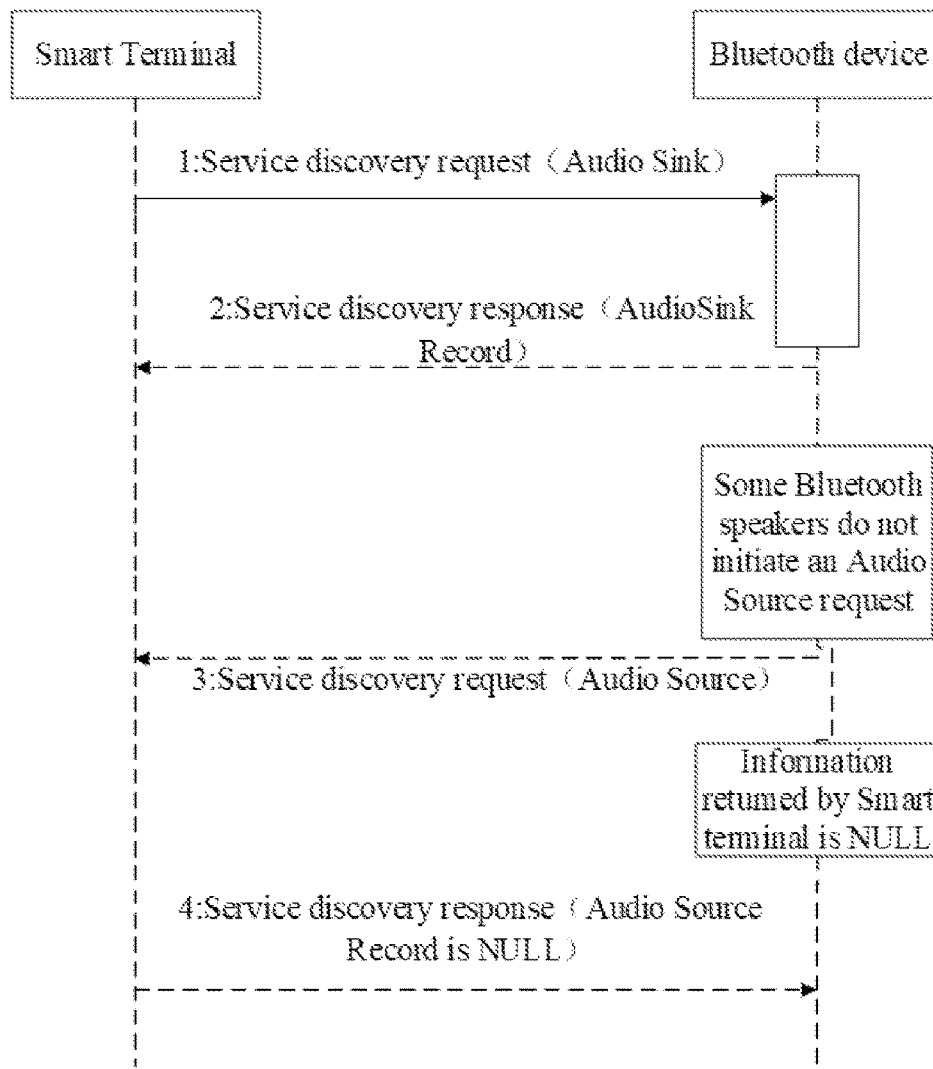

FIG. 6 is a schematic diagram of a Bluetooth device actively initiating a service discovery request to a smart terminal in the preferred embodiment of the Bluetooth connection method of the present application.

Figure 7:
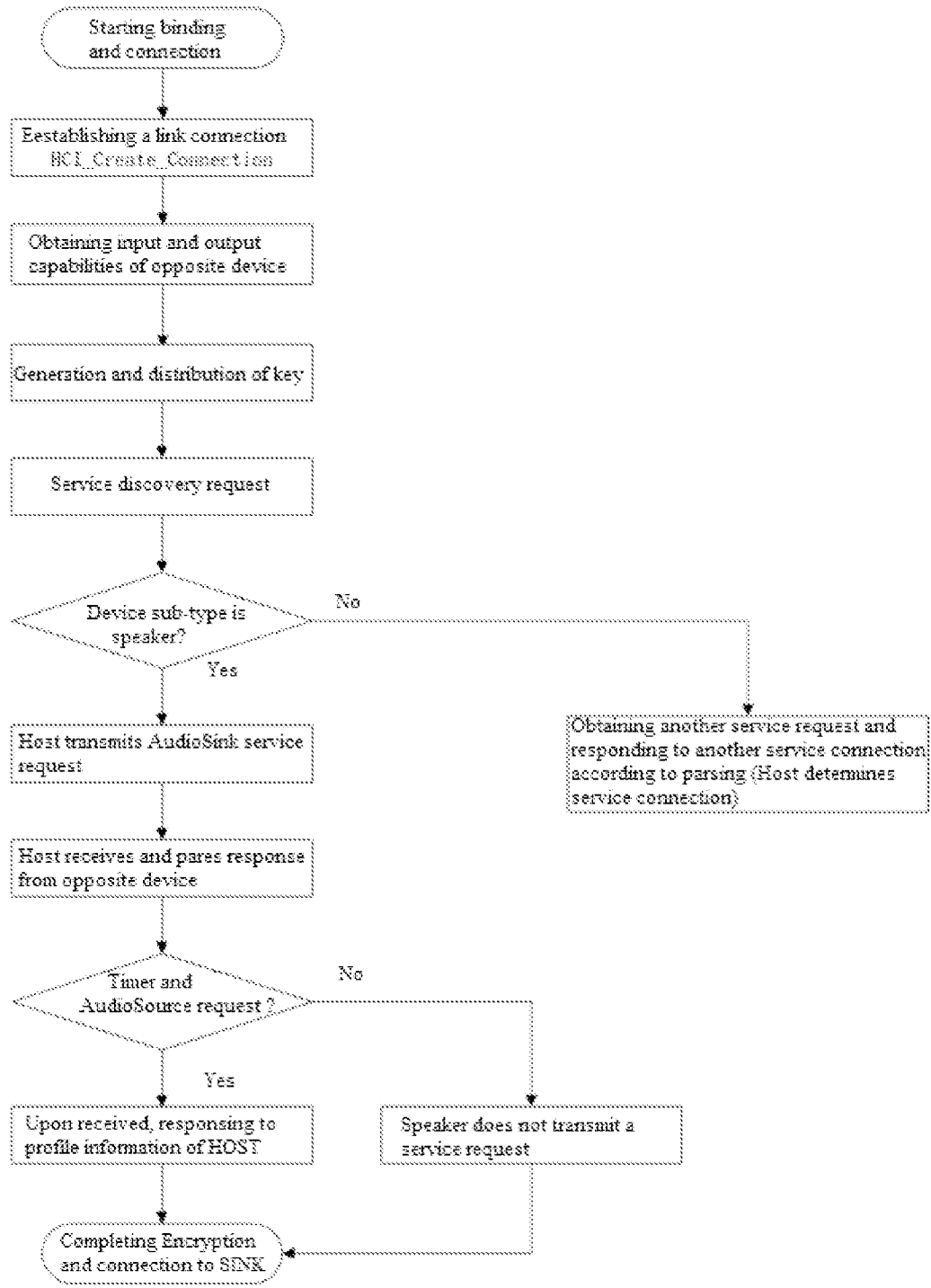

FIG. 7 is a schematic flowchart of an entire connection process in the preferred embodiment of the Bluetooth connection method of the present application.

Figure 8:
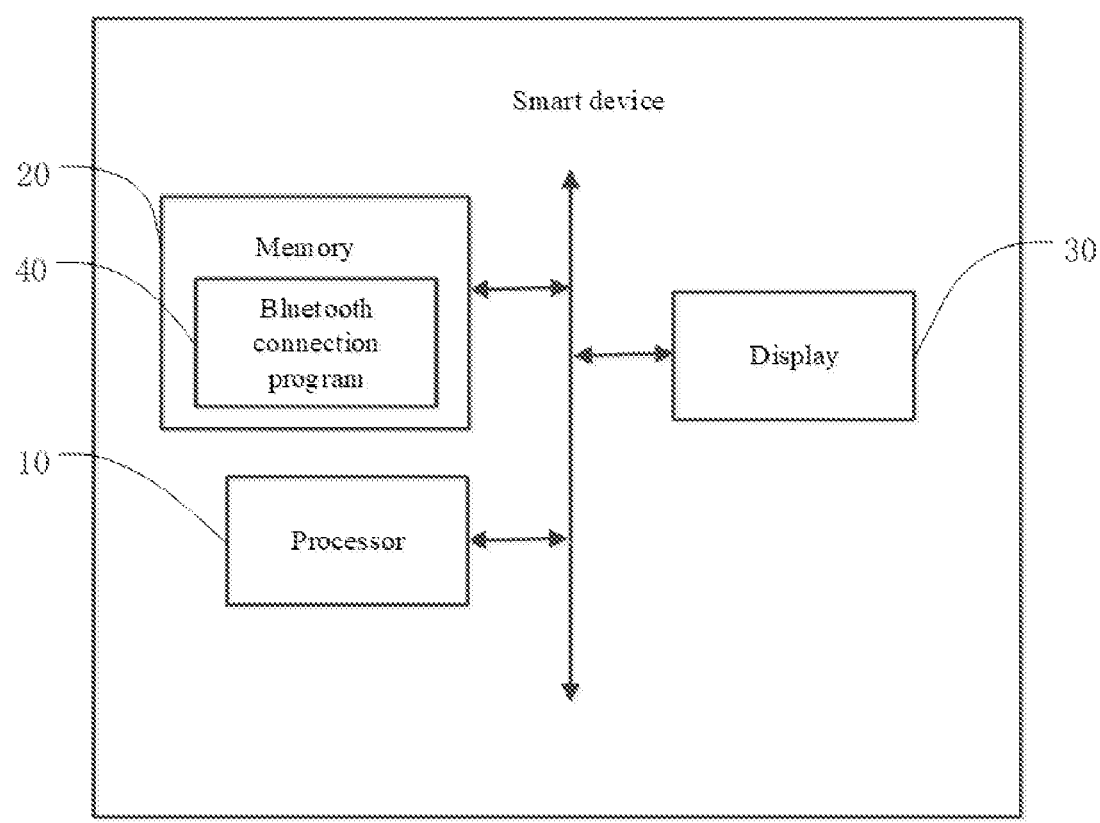

FIG. 8 is a schematic diagram of an operating environment of a preferred embodiment of a smart terminal according to the present application.

DETAILED DESCRIPTION

Implementations of the Present Application

To make the objectives, technical solutions, and advantages of the present application more clear and definite, the present application is illustrated in detail below by referring to the accompanying drawings and illustrating the embodiments. It should be understood that the specific implementations described here are only used to explain the present application, and are not used to limit the present application.

A Bluetooth connection method of a preferred embodiment of the present application is shown in FIG. 1. The Bluetooth connection method includes the following steps S10-S40.

At Step S10: a connection with a Bluetooth device and binding with the Bluetooth device is established to obtain one or more services supported by the Bluetooth device.

A detailed process of the Step S10 is shown in FIG. 2, which is a flowchart of the step S10 in the Bluetooth connection method according to the present application.

As shown in FIG. 2, the step S10 includes:

S11: establishing a link connection with the Bluetooth device;

S12: transmitting a request for obtaining input and output capabilities of the Bluetooth device to the Bluetooth device, receiving the input and output capabilities fed back by the Bluetooth device according to the request, and selecting a mode of binding with the Bluetooth device according to the input and output capabilities;

S13: generating and transmitting a key to the Bluetooth device after determining the mode of binding with the Bluetooth device; and S14: transmitting an SDP service discovery request to the Bluetooth device to obtain services supported by the Bluetooth device.

Specifically, an execution body of the present application is a smart terminal (e.g., a device capable of playing an audio and/or a video, such as a smart television, a smartphone, or the like). That is, the present application is a process in which a connection is established between the smart terminal and the Bluetooth device for audio transmission. The smart terminal (e.g., the smart television) first establishes a link connection with the Bluetooth device. For example, the smart terminal (e.g., a host of the smart terminal) initiates a link connection (HCI_Create_Connection) to the Bluetooth device through a protocol stack. After the link connection between the smart terminal and the Bluetooth device is successful, the smart terminal transmits a request for obtaining input and output capabilities of the Bluetooth device to the Bluetooth device, so that the smart terminal knows the input and output capabilities of the Bluetooth device. After the Bluetooth device receives the request for obtaining the input and output capabilities of the Bluetooth device, the Bluetooth device feeds back the input and output capabilities to the smart terminal according to the request. After receiving the input and output capabilities fed back by the Bluetooth device, the smart terminal selects a mode of binding with the Bluetooth equipment according to the input and output capabilities.

The mode of binding includes at least one of Numeric Comparison (that is applicable to a low-power security connection, but not to a conventional pairing), Just Works (that is a mode of binding in which no confirmation is required by the Bluetooth device and it is also indicated that the Bluetooth device has no input and output capabilities), Out-of-Band (that is a kind of information that is expected to be transmitted to a user for timely processing without a conventional transmission method in a data transmission process when one of the two parties has an important event and wants to notify the other party quickly, such as an interrupt key of a UNIX system, a terminal flow control identifier, which is referred to as Out-of-Band data), and Passkey Entry login (that is registered by password authentication).

Further, after the smart terminal determines the mode of binding (one of the four mode of bindings, for example, if the Bluetooth device is a Bluetooth speaker without input and output capabilities, the mode of binding selects Just Works, that is, no confirmation is required by the Bluetooth speaker) with the Bluetooth device, the smart device generates a key (that is a parameter that is input in an algorithm for converting a plaintext into a ciphertext or converting a ciphertext into a plaintext) and transmits the key to the Bluetooth device, and then the smart terminal transmits an SDP service discovery request to the Bluetooth device for obtaining services supported by the Bluetooth device. The smart terminal can select a service to be connected after knowing which services the Bluetooth device can support.

At Step S20: a device sub-type of the Bluetooth device is obtained to select a service to be connected from the services supported by the Bluetooth device according to the device sub-type.

A detailed process of the Step S20 is shown in FIG. 3, which is a flowchart of the step S20 in the Bluetooth connection method according to the present application.

As shown in FIG. 3, the step S20 includes:

S21: obtaining a device sub-type of the Bluetooth device;

S22: in response to determining that the device sub-type indicates a Bluetooth speaker, actively transmitting a service request to the Bluetooth speaker, and receiving a service request response to the service request from the Bluetooth speaker;

S23: parsing the service request response to obtain and store an identifier value in a singly linked list; and S24: traversing the identify value in the singly linked list to select a service to be connected from the services.

Specifically, the smart terminal obtains a device sub-type (Device Class) of the Bluetooth device, and the Bluetooth device uses a major device class to distinguish a major class, and a minor device class to distinguish a minor class. For example, the speaker is an audio device in the major class and a speaker in the minor class. The smart terminal determines whether the device sub-type is a Bluetooth speaker (0x0400, that is, if the byte is 0x0400, it is indicated that the Bluetooth device is the Bluetooth speaker). If the device sub-type is the Bluetooth speaker (0x0400), the smart terminal actively transmits a service request (SDP_ServiceSearchAttributeRequest) to the Bluetooth speaker, and then the Bluetooth speaker makes a respond to the service request after receiving the service request. The smart terminal receives a service request response (SDP_ServiceSearchAttributeResponse) transmitted by the Bluetooth speaker, and then parses the service request response (that is a value of a field of Service Record Attributes in an SDP Packet) and stores the service request response in a singly linked list. The smart terminal can select a service that needs to be connected preferentially from the services supported by the Bluetooth device according to an identifier value (different identifier values corresponding to different services) by traversing a UniversalUniqueIdentifier (UUID) value (that is for purpose of making all elements in a distributed system to have unique identification information without specifying the identification information through a central control terminal) in the singly linked list. For example, a service that needs to be connected is preferentially selected. More specifically, an audio sink of the Bluetooth speaker is preferentially connected, and such a strategy can solve a conflict connection failure of the speaker supporting multiple services. In addition, if the device sub-type is not a Bluetooth speaker, another service request is obtained, such as a power service of the Bluetooth device, motion data of the Bluetooth device, weather data of the Bluetooth device, or the like.

The singly linked list is a kind of data structure with chain access, in which data elements in the linked list are stored with a group of storage units having arbitrary addresses. The data in the linked list is represented by nodes, and each of the nodes is composed of: an element (an image of a data element) plus a Pointer (indicating a storage location of subsequent element), where, the element is a storage unit storing data, and the Pointer is address data connecting the node.

Further, as shown in FIG. 4, the smart terminal actively transmits a service request (that is, an SDP service discovery request) to the Bluetooth device, and determines whether a device sub-type of the Bluetooth device is a Bluetooth speaker. If the device sub-type is the Bluetooth speaker, the smart terminal actively transmits the service request to the Bluetooth speaker; receives a service request response transmitted by the Bluetooth speaker and parses the service request response to obtain an identifier value and store the identifier value in a singly linked list; and traverses the identifier value in the singly linked list, and selects a service to be connected from services supported by the Bluetooth device. If the device sub-type is not the Bluetooth speaker, then other service requests are obtained.

At Step S30: an audio input service request is transmitted to the Bluetooth device and a response to the audio input service request is received, an audio output service request transmitted by the Bluetooth device is received and a response data packet is generated and transmitted to the Bluetooth device.

A detailed process of the Step S30 is shown in FIG. 5, which is a flowchart of the step S30 in the Bluetooth connection method according to the present application.

As shown in FIG. 5, the step S30 includes:
S31: upon transmitting the audio input service request to the Bluetooth device, receiving and parsing a response to the audio input service request from the Bluetooth device;
S32: in response to receiving the audio output service request from the Bluetooth device, determining whether a connection to an audio receiving end service is started; and
S33: in response to determining that the connection is started, obtaining an audio output record and adding an identifier value, and generating and transmitting the response data packet to the Bluetooth device.

Specifically, the smart terminal transmits an audio input (Audiosink) service request to the Bluetooth device. The Bluetooth device makes a respond to the request after receiving the audio input service request. The smart terminal receives the response of the Bluetooth device to the audio input service request, and parses the response of the Bluetooth device to the audio input service request. Since different Bluetooth devices support different services, a portion of the Bluetooth devices actively can initiate an audio output (Audiosource) service request confirmation. After receiving the AudioSource service request, the smart terminal determines whether a connection to an audio receive end (sink) service is started. If the connection is started, the smart terminal fills in an audio output (AudioSource) record and adds a corresponding UUID value (the identifier value), and assemblies and transmits a response data packet to the Bluetooth device. In addition, if the connection is not started, an empty content of a response is transmitted to the Bluetooth device.

For example, if the Bluetooth device is the Bluetooth speaker, that is, the Bluetooth speaker is source and the smart terminal (TV) is sink, then the TV needs to determine whether the sink is started before transmitting a data packet to the Bluetooth speaker.

Further, as shown in FIG. 6, the smart terminal transmits an audio input service request (AudioSink) to the Bluetooth device, and a portion of Bluetooth devices can actively initiate an audio output (Audio Source) service discovery request to the smart terminal in order to further confirm the connection. When the smart terminal receives the audio output (Audio source) service discovery request, the smart terminal can fill in a response data field and responds to the Bluetooth device. However, another portion of Bluetooth speaker cannot initiate an audio output (audio source) service discovery request, and thus the information replied by the smart terminal is null, that is, the content of the response transmitted by the smart terminal to the Bluetooth device is null.

At Step S40: an encryption instruction is transmitted to the Bluetooth device, a connection to an audio receiving end service of the Bluetooth device is started in response to completion of the encryption, and audio transmission to the Bluetooth device is started in response to success of the connection to the audio receiving end service.

Specifically, after transmission of the services of the smart terminal and the Bluetooth device is completed, the smart terminal starts encryption to transmit an encryption instruction to the Bluetooth device, and then the Bluetooth device receives the encryption instruction for encryption. For example, the smart terminal transmits an encryption command HCI_Set_Connection_Encryption to the Bluetooth device, and after both parties of the smart terminal and the Bluetooth device agree to encryption, both parties can receive event: SHCI_Encryption_Change (on) to complete the encryption. After the encryption is completed, the smart terminal starts a connection to initiate an audio receive end (sink) service of the Bluetooth device, and finally starts audio transmission after the connection is completed.

Further, as shown in FIG. 7, an entire process of performing Bluetooth connection between the smart terminal and the Bluetooth device in the present application is as follows.

After the smart terminal (for example, TV) establishes a binding connection with the Bluetooth device to successfully establish a link connection (HCI_Create_Connection), the smart terminal obtains input and output capabilities fed back by the Bluetooth device. After determining a mode of binding with the Bluetooth device, the smart terminal generates a key and transmits the key to the Bluetooth device. The smart terminal transmits an SDP service discovery request to the Bluetooth device, and determines a device sub-type of the Bluetooth device. If the device sub-type is not the Bluetooth speaker, another service request is obtained, and a connection to another service is performed according to a parsing response (the smart terminal determines the connection of the service). If the device sub-type is the Bluetooth speaker, the smart terminal actively transmits an audio sink service request to the Bluetooth speaker, and receives and parses a service request response transmitted by the Bluetooth speaker, and starts a timer to wait, and determines whether the smart terminal receives an audio source service request transmitted by the Bluetooth device (at this time, the Bluetooth speaker). If the smart terminal does not receive an audio source service request, the Bluetooth device does not transmit the service request. If the smart terminal receives the audio source service request transmitted by the Bluetooth device, the Bluetooth device responds to the smart terminal profile (protocol) information, and the smart terminal initiates encryption to start a connection to an audio receive end (sink) service.

According to the present application, by improving and optimizing a connection flow between the smart terminal and the Bluetooth device, the smart terminal actively initiates obtaining the services of the Bluetooth device, decides to select the service to be connected, increases the receipt of the service request of the Bluetooth device and performs corresponding response processing, so that the compatibility and universality of the Bluetooth device can be maximally improved, the speed of the binding connection with the Bluetooth device can be improved, the compatibility problem can be solved, good product experience is brought to the user, and the core competitiveness of the product is improved.

Further, as shown in FIG. 8, based on the above Bluetooth connection method, the present application correspondingly provides a smart terminal including a processor 10, a memory 20, and a display 30. FIG. 8 only shows a portion of components of the smart terminal, but it is to be understood that not all of the components shown are required to be implemented, but that more or fewer components may be implemented instead.

In some embodiments, the memory 20 may be an internal storage unit of the smart terminal, such as a hard disk or a memory of the smart terminal. In another embodiment, the memory 20 may also be an external storage device of the smart terminal, such as a plug-in hard disk, a Smart Media (SMC), a Secure Digital (SD) card, a Flash Card, or the like provided on the mart terminal. Further, the memory 20 may also include both an internal storage unit and an external storage device of the smart terminal. The memory 20 is configured to store an application software installed on the smart terminal and various types of data, such as a program code for installing the smart terminal. The memory 20 may also be used to temporarily store data that has been output or is to be output. In an embodiment, the memory 20 stores a Bluetooth connection program 40 that can be executed by the processor 10 to implement the Bluetooth connection method of the present application.

In some embodiments, the processor 10 may be a Central Processing Unit (CPU), a microprocessor or other data processing chip for running program codes or processing data stored in the memory 20, such as executing the Bluetooth connection method or the like.

In some embodiments, the display 30 may be an LED display, a liquid crystal display, a touch-sensitive liquid crystal display, an Organic Light-Emitting Diode (OLED) touch device, or the like. The display 30 may be used to display information on the smart terminal and for displaying a user interface for visualization. The components 10-30 of the smart terminal may communicate with each other via a system bus.

In an embodiment, when the processor 10 executes the Bluetooth connection program 40 stored in the memory 20, so as to implement the following steps:
 establishing a connection with a Bluetooth device and binding with the Bluetooth device to obtain one or more services supported by the Bluetooth device;
 obtaining a device sub-type of the Bluetooth device, and selecting a service to be connected from the services based on the device sub-type;
 transmitting an audio input service request to the Bluetooth device, and receiving a response to the audio input service request from the Bluetooth device, upon receiving an audio output service request from the Bluetooth device, generating and transmitting a response data packet to the Bluetooth device; and
 transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device.

The establishing of the connection and the binding specifically include:
 establishing a link connection with the Bluetooth device;
 transmitting a request for obtaining input and output capabilities of the Bluetooth device to the Bluetooth device, receiving the input and output capabilities fed back by the Bluetooth device according to the request, and selecting a mode of binding with the Bluetooth device according to the input and output capabilities;
 upon determining the mode of binding with the Bluetooth device, generating and transmitting a key to the Bluetooth device; and
 transmitting a Service Discovery Protocol (SDP) service discovery request to the Bluetooth device to obtain the services supported by the Bluetooth device.

The obtaining the device sub-type and the selecting of the service to be connected specifically include:
 obtaining the device sub-type of the Bluetooth device;
 in response to determining that the device sub-type indicates a Bluetooth speaker, actively transmitting a service request to the Bluetooth speaker, and receiving a service request response to the service request from the Bluetooth speaker;
 parsing the service request response to obtain and store an identifier value in a singly linked list; and
 traversing the identify value in the singly linked list to select a service to be connected from the services.

The transmitting the audio input service request to the Bluetooth device and receiving the response to the audio input service request, the receiving the audio output service request and generating and transmitting the response data packet to the Bluetooth device specifically includes:
 upon transmitting the audio input service request to the Bluetooth device, receiving and parsing a response to the audio input service request from the Bluetooth device;
 in response to receiving the audio output service request from the Bluetooth device, determining whether a connection to an audio receiving end service is started; and
 in response to determining that the connection is started, obtaining an audio output record and adding an identifier value, and generating and transmitting the response data packet to the Bluetooth device.

The steps further include, after the determining whether the connection is started,
 in response to determining that the connection is not started, transmitting an empty content of a response to the Bluetooth device.

The steps further include, after the obtaining the device sub-type of the Bluetooth device, in response to determining that the device sub-type does not indicate the Bluetooth speaker, obtaining another service request.

The mode of binding includes at least one of numeric comparison, just works, out-of-band, or password entry.

Further, as shown in FIG. 4 or 6, an embodiment of the present application further provides a Bluetooth connection system including a smart terminal and a Bluetooth device, the smart terminal establishing a connection with the Bluetooth device and binding with the Bluetooth device, where, the smart terminal is configured for obtaining one or more services supported by the Bluetooth device; the smart terminal is further configured for obtaining a device sub-type of the Bluetooth device and selecting a service to be connected from the services based on the device sub-type; the smart terminal is further configured for transmitting an audio input service request to the Bluetooth device and receiving a response to the audio input service request from the Bluetooth device; the Bluetooth device is configured for transmitting an audio output service request to the smart terminal, and the smart terminal is configured for generating and transmitting a response data packet to the Bluetooth device; and the smart terminal is further configured for transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device.

Further, an embodiment of the present application further provides a computer storage medium having stored thereon a Bluetooth connection program, where the Bluetooth connection program, when executed by a processor, implements steps of the above-described Bluetooth connection method.

In summary, the present application provides a Bluetooth connection method and system, a smart terminal, and a computer storage medium. The method includes: establishing a connection with a Bluetooth device and binding with the Bluetooth device to obtain one more services supported by the Bluetooth device; obtaining a device sub-type of the Bluetooth device to select a service to be connected from the services based on the device sub-type; transmitting an audio input service request to the Bluetooth device, and receiving a response to the audio input service request from the Bluetooth device, upon receiving an audio output service request from the Bluetooth device, generating and transmitting a response data packet to the Bluetooth device; and transmitting an encryption instruction to the Bluetooth device, in response to completion of the encryption, starting a connection to an audio receiving end service of the Bluetooth device, and in response to success of the connection to the audio receiving end service, starting audio transmission to the Bluetooth device. According to the present application, the services of the Bluetooth device are actively obtained and selected by optimizing a connection process with the Bluetooth device, and a response processing is performed on a service request of the Bluetooth device in time, so that not only a binding connection speed with the Bluetooth device can be improved, but also compatibility and versatility of the Bluetooth device can be improved.

Of course, it should be understood by those of ordinary skill in the art that all or a portion of the flows of implementing the methods of the embodiments described above may be accomplished by a computer program instructing relevant hardware (e.g., a processor, a controller, etc.) that may be stored in a computer-readable computer storage medium that, when executed, may include the flows of the method embodiments described above. The computer storage medium may be a memory, a magnetic disk, an optical disk, or the like.

It should be understood that the application of the present application is not limited to the above examples, and that modifications or changes may be made to those of ordinary skill in the art in light of the above description, all of which are intended to fall within the scope of the claims appended to the present application.

What is claimed is:

1. A Bluetooth connection method applied to a smart terminal, comprising:
    establishing a connection with a Bluetooth device and binding with the Bluetooth device to obtain one or more services supported by the Bluetooth device;
    obtaining a device sub-type of the Bluetooth device, and selecting a service to be connected from the services based on the device sub-type;
    transmitting an audio input service request based on the selected service to the Bluetooth device, and receiving a response to the audio input service request from the Bluetooth device; and
    upon receiving an audio output service request from the Bluetooth device,
        generating and transmitting a response data packet to the Bluetooth device;
        transmitting an encryption instruction to the Bluetooth device to perform an encryption process;
        in response to determining completion of the encryption process, starting a connection to an audio input service of the Bluetooth device; and
        in response to determining success of the connection to the audio input service, starting audio transmission to the Bluetooth device.

2. The Bluetooth connection method of claim 1, wherein the establishing of the connection and the binding specifically comprise:
    establishing a link connection with the Bluetooth device;
    transmitting a first request for obtaining input and output capabilities of the Bluetooth device to the Bluetooth device;
    receiving information on the input and output capabilities fed back by the Bluetooth device in response to the first request, and selecting a mode of binding with the Bluetooth device based on the information;
    binding with the Bluetooth device in the mode;
    generating and transmitting a key to the Bluetooth device; and
    transmitting a Service Discovery Protocol (SDP) service discovery request to the Bluetooth device to obtain the services supported by the Bluetooth device.

3. The Bluetooth connection method of claim 2, wherein the selecting of the service to be connected comprise:
    in response to determining that the device sub-type indicates a Bluetooth speaker, actively transmitting a second service request to the Bluetooth speaker;
    upon receiving a service request response to the second service request from the Bluetooth speaker, parsing the service request response to obtain an identifier value;
    traversing a singly linked list to find service information corresponding to the identifier value from the singly linked list; and
    a selecting the service to be connected from the services based on the service information.

4. The Bluetooth connection method of claim 3, wherein the receiving of the response to the audio input service request comprises:

receiving and parsing a response to the audio input service request from the Bluetooth device; and the generating and transmitting of the response data packet to the Bluetooth device comprises:

in response to determining, from the parsed response to the audio input service request, that the audio input service is enabled, generating the response data packet based on an audio output record and an audio output identifier value, and transmitting the generated response data packet to the Bluetooth device.

5. The Bluetooth connection method of claim 4, the generating and transmitting of the response data packet to the Bluetooth device further comprises:

in response to determining, from the parsed response to the audio input service request, that the audio input service is disabled, generating and transmitting a null response data packet to the Bluetooth device.

6. The Bluetooth connection method of claim 3, the selecting of the service to be connected further comprises:

in response to determining that the device sub-type does not indicate the Bluetooth speaker, transmitting another service request to the Bluetooth device, and selecting the service to be connected from the services based on a response to the another service request from the Bluetooth device.

7. The Bluetooth connection method of claim 2, wherein the mode of binding comprises at least one of numeric comparison, just works, out-of-band, or passkey entry.

8. A Bluetooth connection method applied to a Bluetooth device, comprising:

establishing a connection with a smart terminal and binding with the smart terminal, to enable the smart terminal to obtain one or more services supported by the Bluetooth device and a device sub-type of the Bluetooth device and select a service to be connected from the services based on the device sub-type;

upon receiving an audio input service request from the smart terminal, responding to the audio input service request, and transmitting an audio output service request to the smart terminal to trigger the smart terminal to generate and return a response data packet to the Bluetooth device; and in response to receiving an encryption instruction from the smart terminal, perform an encryption process, to enable the smart terminal to start a connection to an audio input service of the Bluetooth device in response to determining completion of the encryption process and start audio transmission to the Bluetooth device in response to determining success of the connection to the audio input service.

9. The Bluetooth connection method of claim 8, wherein the establishing of the connection and the binding specifically comprise:

establishing a link connection with the smart terminal;

in response to receiving a first request for obtaining input and output capabilities of the Bluetooth device from the smart terminal, feeding back first information on the input and output capabilities to the smart terminal to enable the smart terminal to select a mode of binding with the Bluetooth device based on the first information, bind with the Bluetooth device in the mode, and generate and return a key to the Bluetooth device; and in response to receiving a Service Discovery Protocol (SDP) service discovery request from the smart terminal, transmitting second information on the services supported by the Bluetooth device to the smart terminal.

10. The Bluetooth connection method of claim 9, wherein the mode of binding comprises at least one of numeric comparison, just works, out-of-band, or passkey entry.

11. A smart terminal, comprising:

A processor; and

A memory storing thereon a Bluetooth connection program executable by the processor to perform operations comprising:

establishing a connection with a Bluetooth device and binding with the Bluetooth device to obtain one or more services supported by the Bluetooth device;

obtaining a device sub-type of the Bluetooth device, and selecting a service to be connected from the services based on the device sub-type;

transmitting an audio input service request based on the selected service to the Bluetooth device, and receiving a response to the audio input service request from the Bluetooth device; and upon receiving an audio output service request from the Bluetooth device, generating and transmitting a response data packet to the Bluetooth device;

transmitting an encryption instruction to the Bluetooth device to perform an encryption process;

in response to determining completion of the encryption process, starting a connection to an audio input service of the Bluetooth device; and in response to determining success of the connection to the audio input service, starting audio transmission to the Bluetooth device.

12. The smart terminal of claim 11, wherein the establishing of the connection and the binding comprise:

establishing a link connection with the Bluetooth device;

transmitting a first request for obtaining input and output capabilities of the Bluetooth device to the Bluetooth device;

receiving information on the input and output capabilities fed back by the Bluetooth device in response to the first request, and selecting a mode of binding with the Bluetooth device based on the information;

binding with the Bluetooth device in the mode;

generating and transmitting a key to the Bluetooth device; and transmitting a Service Discovery Protocol (SDP) service discovery request to the Bluetooth device to obtain the services supported by the Bluetooth device.

13. The smart terminal of claim 12, wherein the selecting of the service to be connected comprises:

in response to determining that the device sub-type indicates a Bluetooth speaker, actively transmitting a second service request to the Bluetooth speaker;

upon receiving a service request response to the second service request from the Bluetooth speaker, parsing the service request response to obtain an identifier value;

traversing a singly linked list to find service information corresponding to the identifier value from the singly linked list; and a selecting the service to be connected from the services based on the service information.

14. The smart terminal of claim 13, wherein the receiving of the response to the audio input service request comprises:

receiving and parsing a response to the audio input service request from the Bluetooth device; and the generating and transmitting of the response data packet to the Bluetooth device comprises:

in response to determining, from the parsed response to the audio input service request, that the audio input service is enabled, generating the response data packet based on an audio output record and an audio output identifier value, and transmitting the generated response data packet to the Bluetooth device.

15. The smart terminal of claim 14, wherein the generating and transmitting of the response data packet to the Bluetooth device further comprises:

in response to determining, from the parsed response to the audio input service request, that the audio input service is disabled, generating and transmitting a null response data packet to the Bluetooth device.

16. The smart terminal of claim 13, wherein the selecting of the service to be connected further comprises:

in response to determining that the device sub-type does not indicate the Bluetooth speaker, transmitting another service request to the Bluetooth device, and selecting the service to be connected from the services based on a response to the another service request from the Bluetooth device.

17. The smart terminal of claim 12, wherein the mode of binding comprises at least one of numeric comparison, just works, out-of-band, or passkey entry.

* * * * *